US011545316B2

United States Patent
Nakamura

(10) Patent No.: US 11,545,316 B2
(45) Date of Patent: Jan. 3, 2023

(54) INPUT DEVICE AND IMAGE FORMING APPARATUS INCLUDING THE SAME

(71) Applicant: SHARP KABUSHIKI KAISHA, Sakai (JP)

(72) Inventor: Yasushi Nakamura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/506,586

(22) Filed: Oct. 20, 2021

(65) Prior Publication Data
US 2022/0139645 A1 May 5, 2022

(30) Foreign Application Priority Data
Oct. 30, 2020 (JP) .............................. JP2020-183061

(51) Int. Cl.
*H01H 13/14* (2006.01)
*H01H 13/20* (2006.01)
*G06F 3/02* (2006.01)
*H04N 1/00* (2006.01)

(52) U.S. Cl.
CPC ........... *H01H 13/14* (2013.01); *G06F 3/0202* (2013.01); *H01H 13/20* (2013.01); *H04N 1/00384* (2013.01)

(58) Field of Classification Search
CPC ...... H01H 13/14; H01H 13/20; H01H 13/023; H01H 13/50; H01H 13/52; H01H 3/12; H01H 2219/014; H01H 2219/036; H01H 2219/037; H01H 2221/044; G06F 3/0202; G06F 3/02; H04N 1/00384; H04N 1/00493; H04N 1/00564; H04N 1/00
See application file for complete search history.

(56) References Cited

U.S. PATENT DOCUMENTS

| | | | | |
|---|---|---|---|---|
| 7,193,170 B2* | 3/2007 | Katayama | ............ | H01H 13/023 200/310 |
| 8,878,083 B2* | 11/2014 | Haruyama | ............. | H01H 13/88 200/345 |
| 10,026,569 B2* | 7/2018 | Danowski | .............. | H01H 13/04 |

FOREIGN PATENT DOCUMENTS

JP 2001-236852 A 8/2001

\* cited by examiner

*Primary Examiner* — Lheiren Mae A Caroc
(74) *Attorney, Agent, or Firm* — ScienBiziP, P.C.

(57) ABSTRACT

An input device including an operation key arranged in an opening of a panel is provided. The input device also includes a light source and a push button switch each being arranged in a position opposite an opening on a board. The operation key includes: a key top having a pressing part extending toward the push button switch. The pressing part is arranged in a position separated from a center position in planar view of the key top on a line that is parallel to a line connecting connection parts of the key top, which are connected with one pair out of one or more pairs of arms, and passes through the center position. The push button switch is arranged in a position on the board opposite an arrangement position of the pressing part.

7 Claims, 15 Drawing Sheets

INPUT DEVICE AND IMAGE FORMING APPARATUS INCLUDING THE SAME

CROSS-REFERENCE TO RELATED APPLICATION

The present application claims priority from Japanese Application JP2020-183061, the content of which is hereby incorporated by reference into this application.

BACKGROUND

1. Field

An aspect of the present invention relates to improvements on an input device including a mechanical push button switch and an image forming apparatus including such an input device.

2. Description of the Background Art

For an input device including a mechanical push button switch, the configuration is conventionally adopted, in which an operation key is arranged in an opening of a panel while the push button switch is arranged on a board located below the operation key, and a flat key top of the operation key is pushed toward the board so as to cause, with the key top, the push button switch to take a closing action.

A specific configuration of such input device is described in JP 2001-236852 A, for instance. In the configuration described in JP 2001-236852 A, a key top is capable of being pushed with respect to a frame around the key top. Two connection parts opposite to each other are prepared on the periphery of the key top, in an upper right portion and a lower left portion in planar view, for instance, and connected to the frame by a pair of arms each having spring characteristics. When the key top is pushed, the pair of arms is curved with respect to the frame so as to allow the displacement of the key top toward a board. In the configuration in JP 2001-236852 A, a pressing part extending toward the push button switch is formed in a central portion in planar view of the key top, and the push button switch is arranged in a place opposite to the pressing part on the board. When the key top is pushed, the push button switch is so pressed by the pressing part as to take a closing action.

SUMMARY

If such an input device as described above is an input device frequently operated or having an important function, such as a start switch, it is desirable to adopt a configuration enhancing distinguishability by coloring the key top in a unique color, arranging one or more light sources such as light emitting diodes (LEDs) on the back side (board side) of the key top so as to illuminate the key top from the back side or by other means so that the input device may definitely be distinguished from other input devices.

If a key is to be provided on its key top with a light transmissive, symbol displaying part denoting the function of the key and the symbol displaying part is made bright with a light source on the back side of the key top, in particular, it is preferable from the viewpoint of visibility to arrange the symbol displaying part in a central place in planar view on the key top.

In that case, the push button switch and the pressing part cannot be arranged in the central place on the key top and, accordingly, each need to be arranged in a position deviated from the central place. Under such circumstances, the pressing part is deviated from the central place on the key top, so that, if an operator pushes a place on the key top opposite from the place, where the pressing part is arranged, the key top is distorted and a portion of the key top around the pressing part rises, which may prevent the push button switch from certainly taking a closing action.

In view of such points, an aspect of the present invention is aimed at, in an input device including a push button switch and a light source, certainly causing the push button switch to take a closing action and thereby improving the certainty of action even if the push button switch and the pressing part are each arranged in a position deviated from a center position in planar view of the key top and a place on the key top opposite from an arrangement position of the pressing part is pushed.

An input device according to an aspect of the present invention includes an operation key arranged in an opening of a panel, and a light source and a push button switch each arranged in a position opposite to the opening on a board. The operation key includes a key top having a pressing part extending toward the push button switch, a frame formed with a wall surrounding the light source and the push button switch, and one or more pairs of arms extending from connection parts that are provided in positions opposite to each other in a peripheral portion of the key top, respectively, to sandwich the key top between the connection parts toward the frame and connected to the frame. The pressing part is arranged in a position separated from a center position in planar view of the key top on a line that is parallel to a line connecting the connection parts of the key top, which are connected with one pair out of the one or more pairs of arms, and passes through the center position. The push button switch is arranged in a position on the board opposite to an arrangement position of the pressing part.

In the configuration as above, even if the arrangement of the light source prevents the pressing part from being arranged in the center position of the key top, the pressing part is deviated to a position separated from the center position of the key top in the direction, in which the key top is supported on the frame by at least one pair of arms, so that the place on the key top, where the pressing part is arranged, is pushed clown toward the board and the pressing part certainly causes the push button switch to take a closing action even if a place on the key top opposite from the arrangement position of the pressing part is pushed. Consequently, it is possible to improve the certainty of action of the input device while enhancing the distinguishability of the input device by illuminating the key top with the light source from the back face side of the key top.

According to an aspect of the present invention, the push button switch is certainly caused to take a closing action even if the pressing part is so arranged in the key top as to deviate to a position not interfering with an arrangement position of the light source and a peripheral place on the key top opposite from the pressing part as such is pushed, so that it is possible to improve the certainty of action while enhancing the distinguishability of the input device.

DESCRIPTION OF THE PREFERRED EMBODIMENTS

In the following, embodiments of an aspect of the present invention are described based on the accompanying drawings.

Embodiment 1

Figure 1:
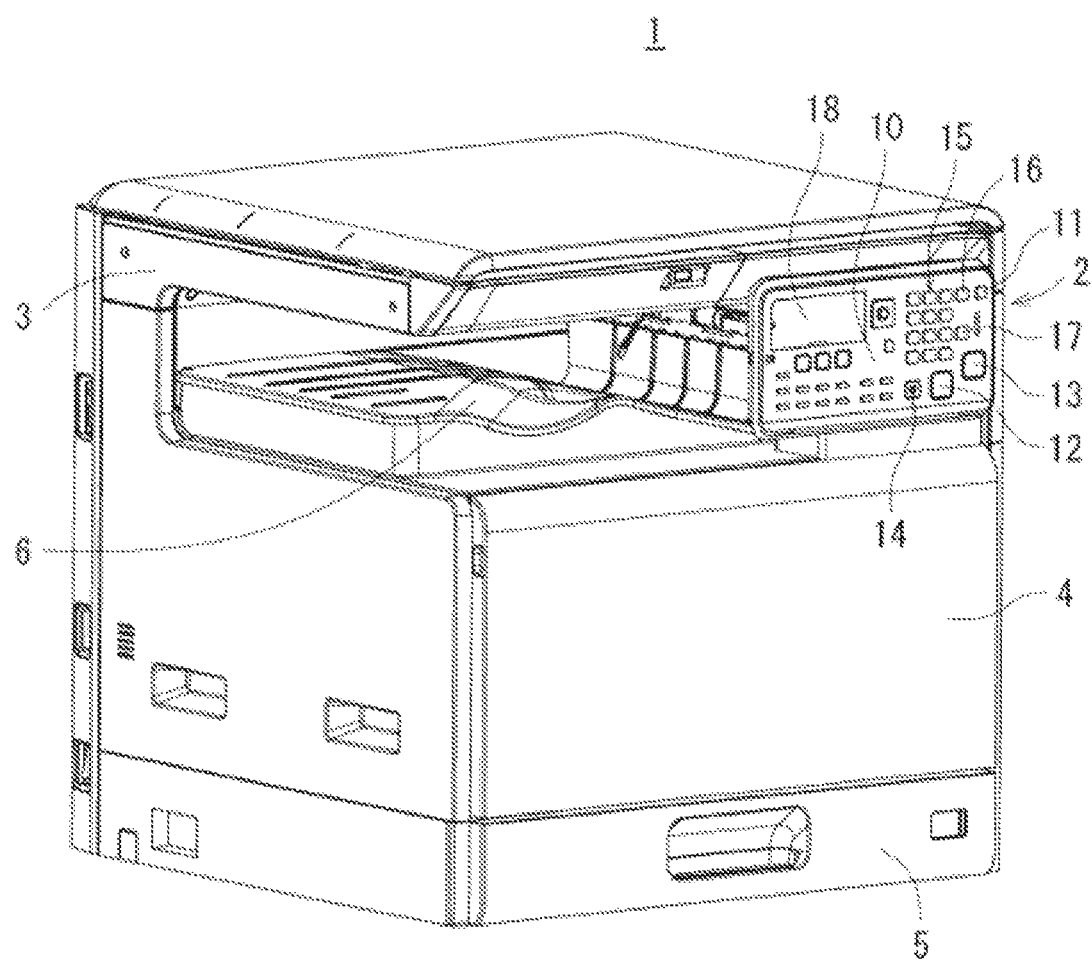
FIG. 1 is a perspective view illustrating a schematic general configuration of an image forming apparatus including an input device according to Embodiment 1.

FIG. 1 is a perspective view illustrating a schematic general configuration of an image forming apparatus including an input device according to Embodiment 1. In FIG. 1, an image forming apparatus 1 is a multifunction peripheral (MFP) having a plurality of functions, such as a copying function (reproducing function), a printing function, a scanning function, a faxing function, and an equalling function.

The image forming apparatus 1 includes an operation device 2, an image reading section 3, an image forming section 4 arranged below the image reading section 3, a paper feeding section 5, and a paper discharge tray 6.

The operation device 2 includes various operation keys for giving various kinds of instructions to the image forming apparatus 1, and a display. To be specific, the operation device 2 includes an operation panel 10 (as a panel) provided with, as mechanical input devices, a power key 11, a color start key 12, a monochrome start key 13, a stop key 14, numeral keys 15, a clear key 16, and a reset key 17. On the operation panel 10, a display 18 for displaying the contents of instructions given through the above various operation keys is arranged. If a copying function of the image forming apparatus 1 is to be used, for instance, an operator operates, on the operation device 2, the numeral keys 15 while checking the display 18 so as to set the number of sheets of paper at the operator's request, then pushes the color start key 12 in the case of color copying or the monochrome start key 13 in the case of monochrome copying so as to cause the image forming section 4 to function. When the copying function is stopped, the stop key 14 is operated.

The input device of Embodiment 1 is applied to the color start key 12 and the monochrome start key 13. The two start keys 12 and 13 are identical. in configuration to each other, so that the configuration of the color start key 12 is detailed below.

Figure 2:
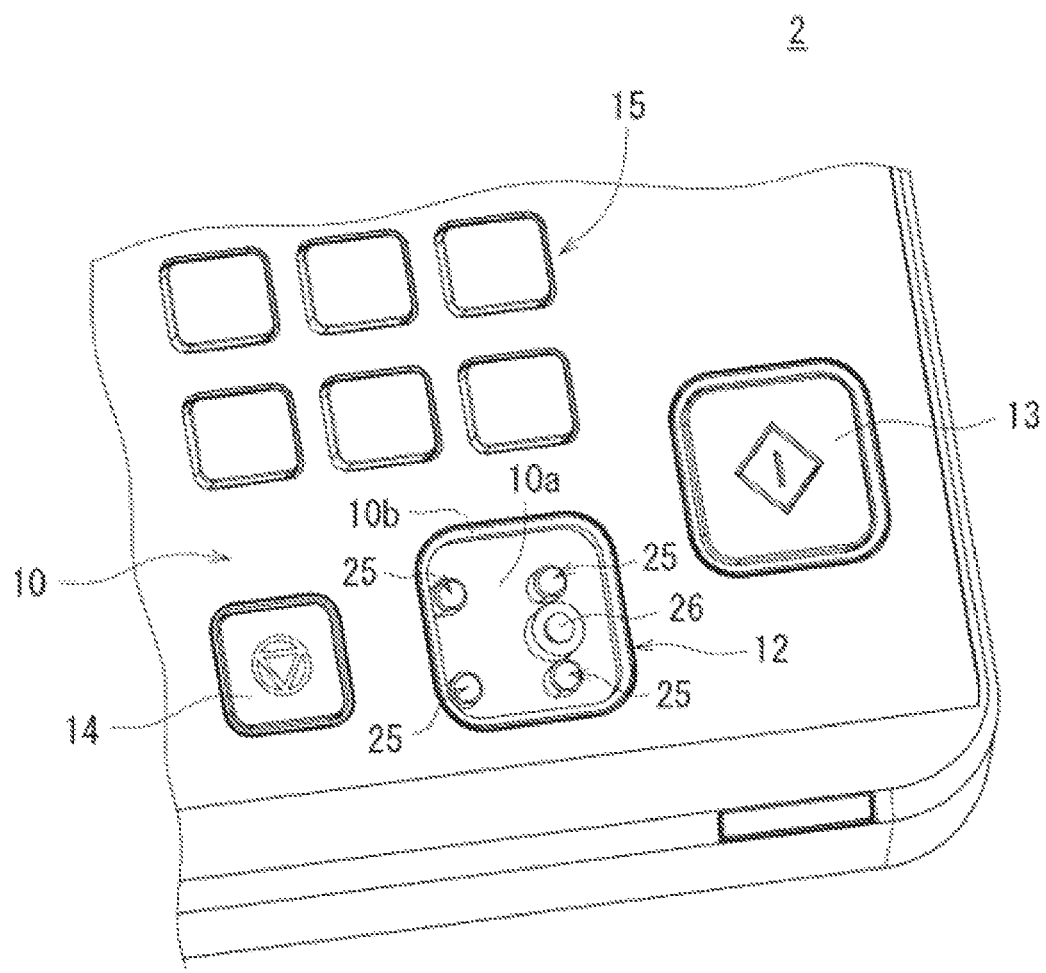
FIG. 2 is an enlarged perspective view illustrating a chief portion around the input device in an operation panel of the image forming apparatus.
Figure 3:
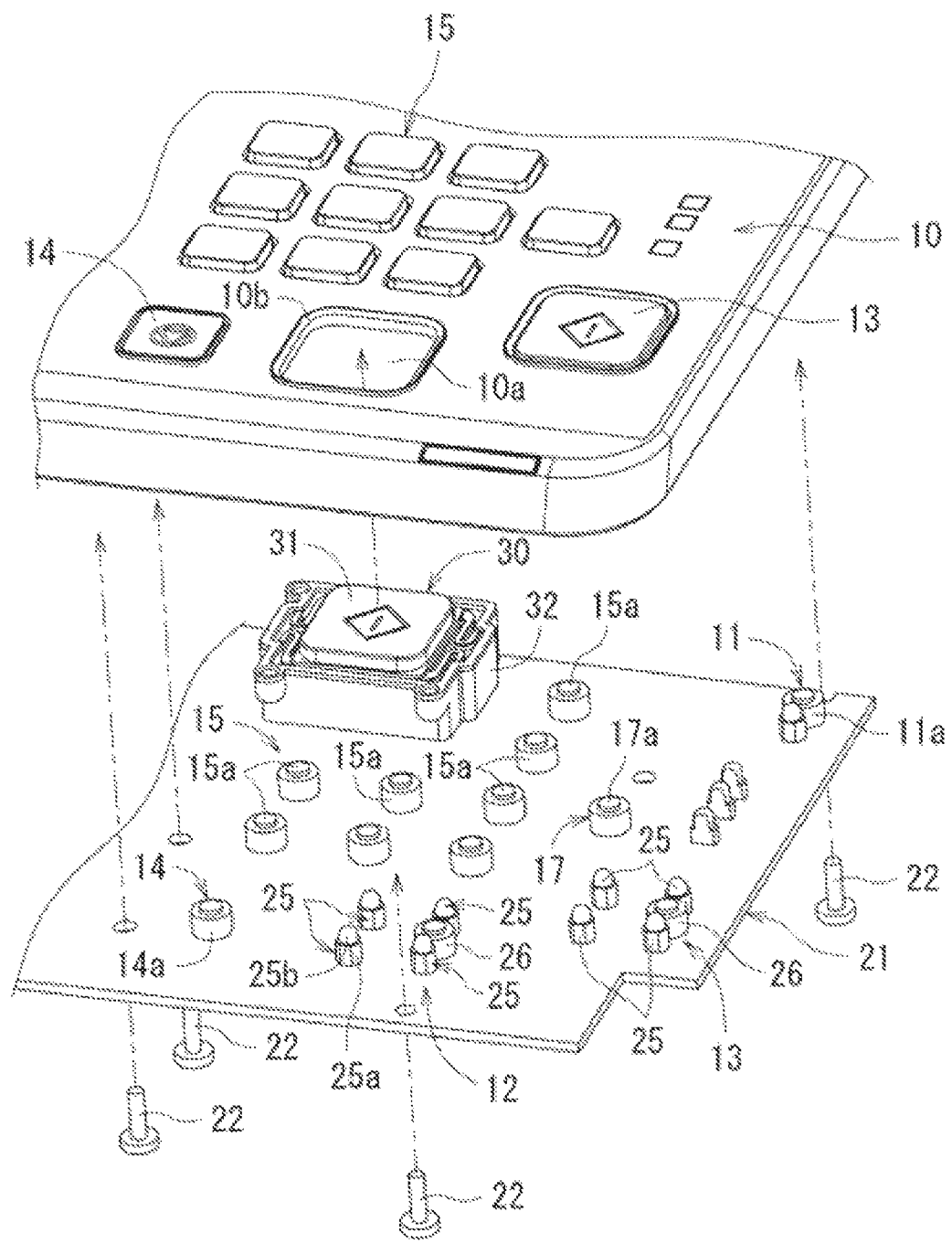
FIG. 3 is an exploded perspective view illustrating installation of a color start key (the input device) in an operation panel.

FIG. 2 is an enlarged perspective view of a chief portion around the color start key 12 of the operation device 2, and FIG. 3 is an exploded perspective view of the chief portion. As illustrated in FIGS. 2 and 3, the operation device 2 includes the operation panel 10 and a board 21 arranged below the operation panel 10. The board 21 is fixed to a back face of the operation panel 10 with a plurality of screws 22 from a lower side (side opposite from a top face side of the operation panel 10).

In the operation panel 10, an opening 10a is formed correspondingly to the place, where the color start key 12 is to be arranged. The opening 10a is formed in a rectangular shape in planar view, and the four corners of the opening 10a are rounded. On the other hand, as seen from FIG. 2, four light sources (hereinafter referred to as light emitting diode (LED) light sources) 25 each consisting of an LED and a push button switch 26 are arranged in places on the board 21 that correspond to the opening 10a. The four LED light sources 25 are arranged in places corresponding to vicinities of the four corners of the opening 10a, and the push button switch 26 is so arranged as to be in a place between two LED light sources 25 at the upper right and the lower right in FIG. 2. Each LED light source 25 is constituted of a main body 25a and a light projector 25b that is located above the main body 25a and has an outer diameter somewhat smaller than the outer diameter of the main body 25a. In the present embodiment, the four LED light sources 25 are provided, while a single LED light source larger in diameter and higher in illuminance than each LED light, source 25 may be provided in a central place in planar view corresponding to the opening 10a. As illustrated in FIG. 3, the monochrome start key 13 includes the four LED light sources 25 and the push button switch 26 provided on the board 21, as is the case with the color start key 12, and other input devices (the power key 11, the stop key 14, the numeral keys 15, and the reset key 17) include push button switches 11a, 14a, 15a, and 17a provided on the board 21, respectively.

As illustrated in FIG. 3, an operation key 30 of the color start key 12 is arranged between the operation panel 10 and the board 21. The operation key 30 includes a key top 31 in a rectangular shape in planar view and a frame 32 arranged around the key top 31. The key top 31 is arranged on an upper end portion side (the operation panel 10 side) of the frame 32. The key top 31 is given a color different from the color of other input devices such as the power key 11 and formed of a material having optical transparency, and is illuminated by light projected from the four LED light sources 25 arranged on the board 21. The key top 31 is formed in a rectangular shape in planar view correspondingly to the opening 10a of the operation panel 10, with the four corners of the key top 31 being rounded, and is made somewhat depressed from the four corners toward a central portion (see FIG. 8 to be referred to later). In the color start key 12 illustrated in FIG. 2, the operation key 30 is omitted so as to clearly illustrate the arrangement relationship, in which the four LED light sources 25 and the push button switch 26 are facing the opening 10a from below.

Figure 4:
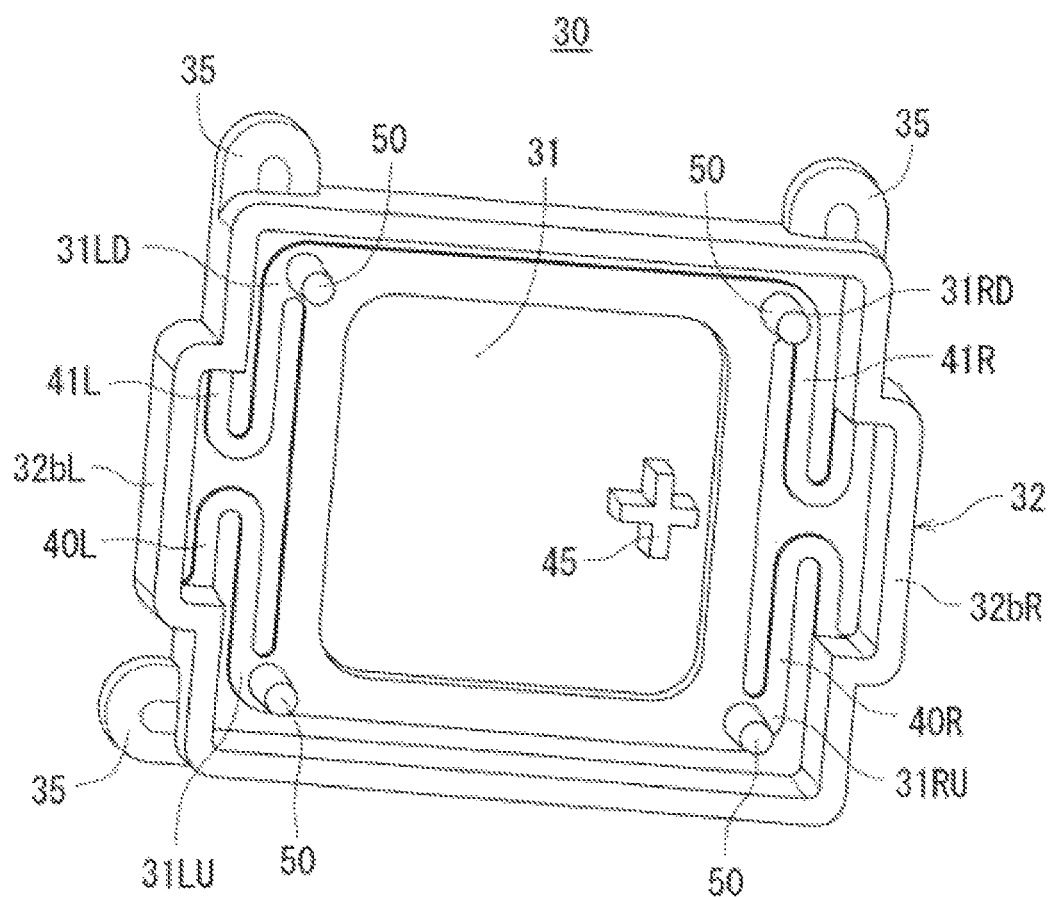
FIG. 4 is a perspective view of an operation key to be included in the color start key; as viewed from a back face side.
Figure 5:
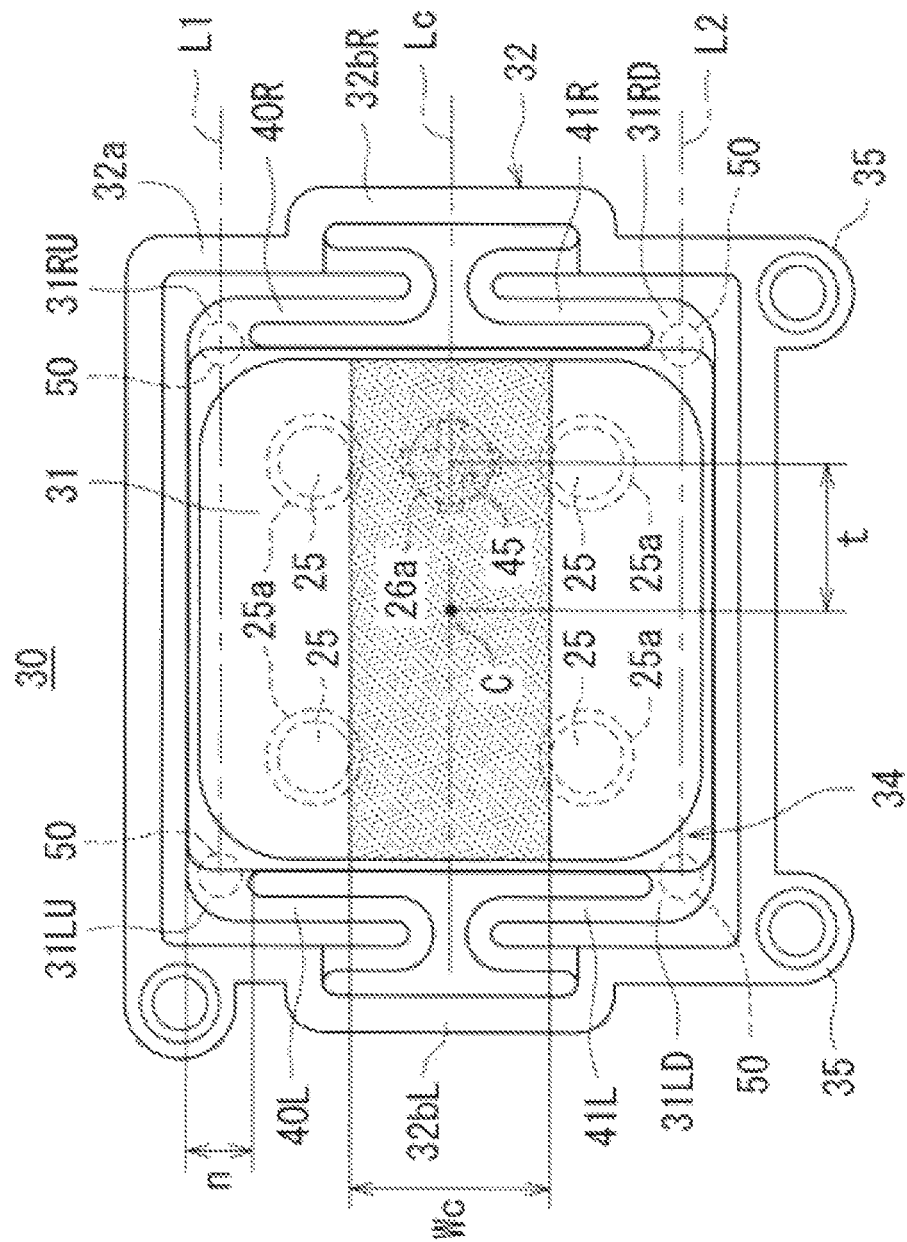
FIG. 5 is a plan view of the operation key.
Figure 6:
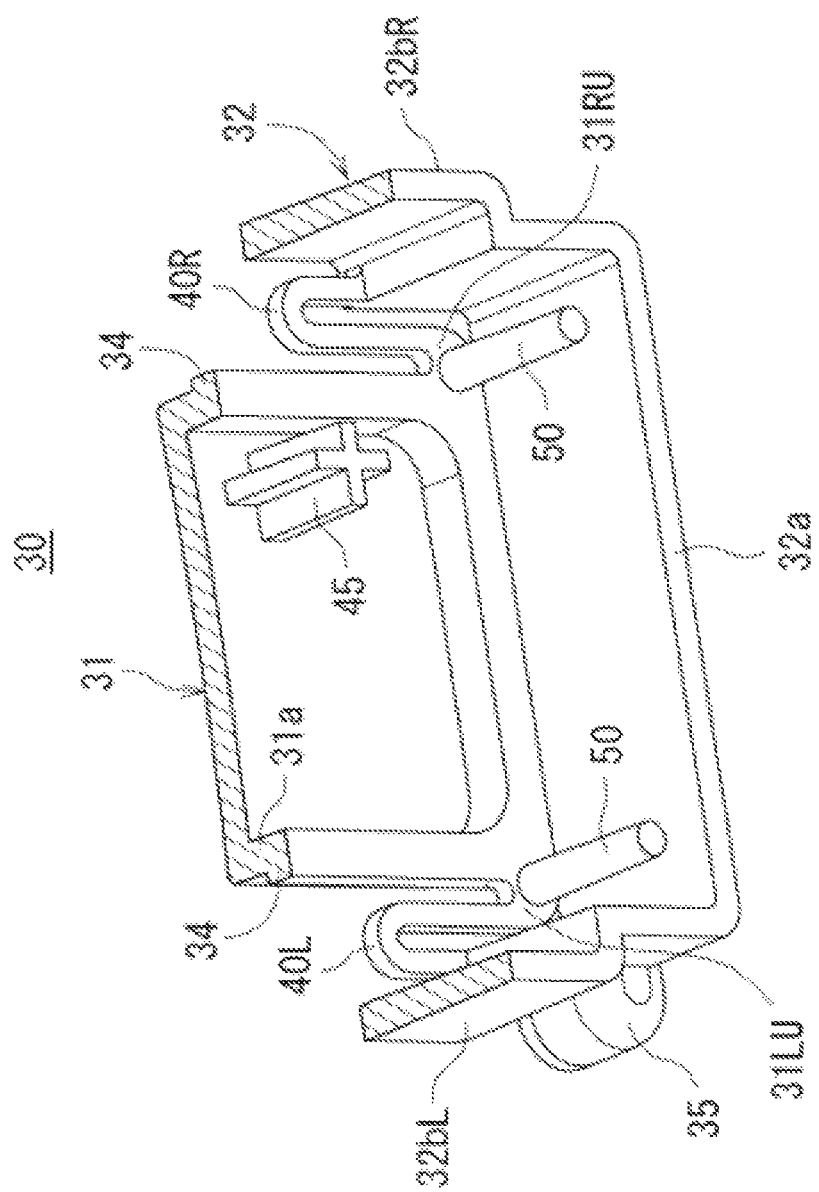
FIG. 6 is a perspective view of the operation key cut in a lateral direction, as viewed from a board side.
Figure 7:
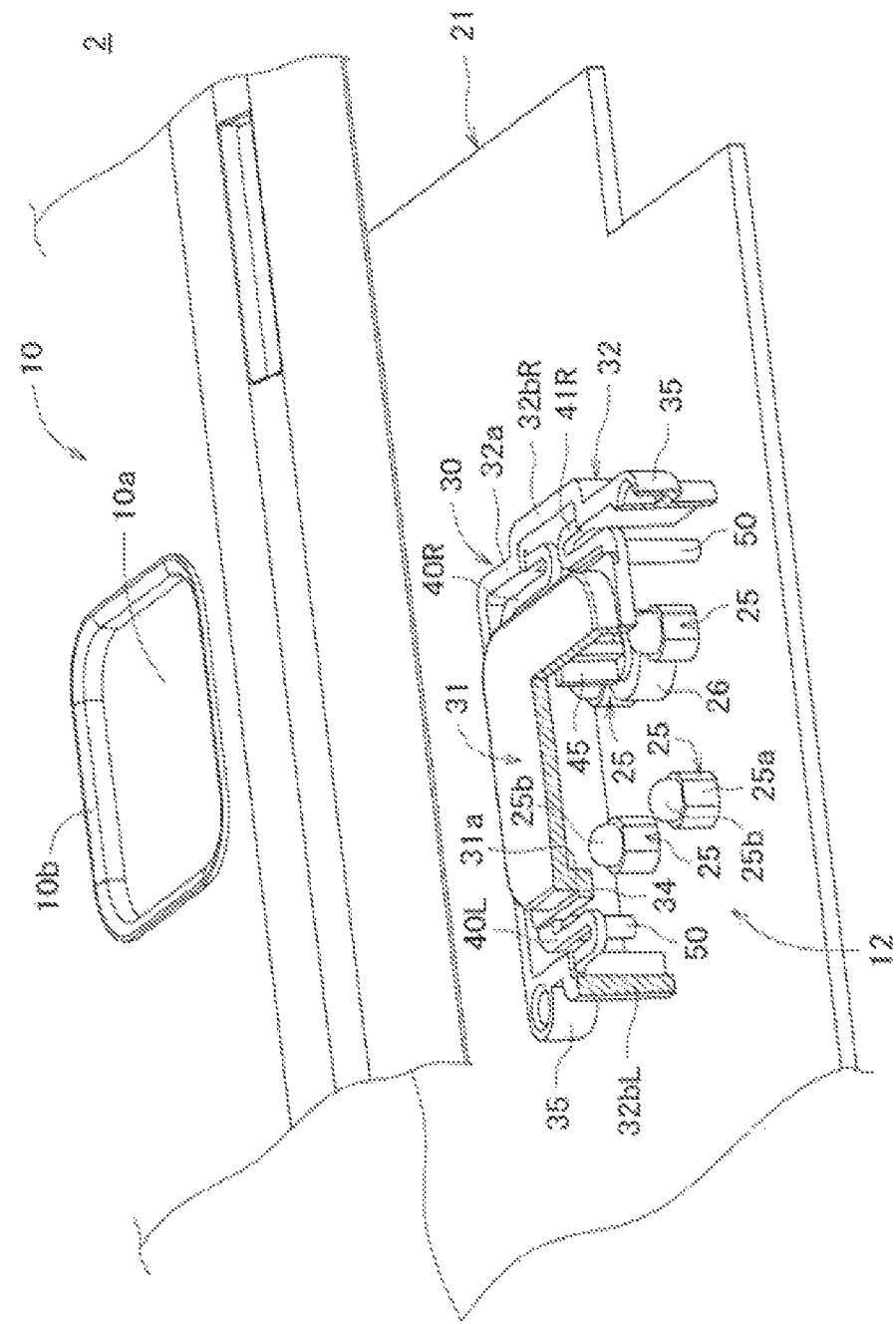
FIG. 7 is an exploded view of an operation device broken into the operation panel and a board, with part of the operation key being cut off, illustrating arrangement relations among an opening, the operation key, light emitting diode (LED) light sources, and a push button switch.
Figure 8:
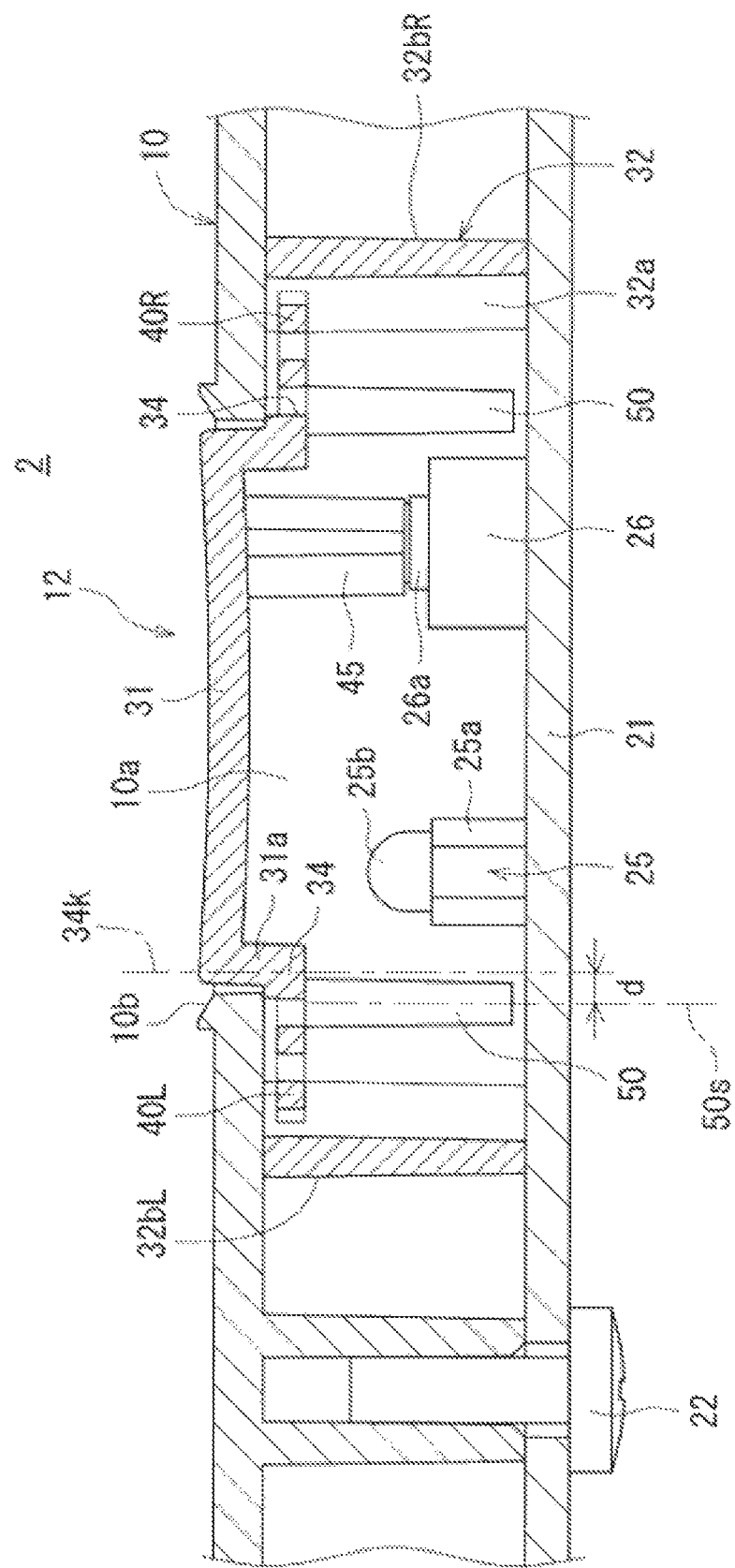
FIG. 8 is a cross-sectional view of a portion around the color start key of the operation device.

The configuration of the operation key 30 in the color start key 12 is detailed below. FIG. 4 is a perspective view of the operation key 30 as viewed from a back side (the board 21 side), and FIG. 5 is a plan view of the operation key 30. FIG. 6 is a perspective view of the operation key 30 cut in a central portion, as viewed from obliquely below, and FIG. 7 is a perspective view illustrating the inside of the operation device 2 broken into the operation panel 10 and the board 21, with part of the operation key 30 of the color start key 12 being cut off. FIG. 8 is a cross-sectional view of a portion around the color start key 12 of the operation device 2.

In FIGS. 4 through 8, the frame 32 of the operation key 30 in the color start key 12 consists of a wall 32a in an approximately rectangular shape in planar view that surrounds the four LED light sources 25 and the push button switch 26. A bottom portion of the wall 32a is in contact with the board 21, and the wall 32a is so formed as to position the key top 31 at a level almost identical to the level of the opening 10a of the operation panel 10. In an upper end portion of the wall 32a, positioning parts 35 are formed at upper left, lower left, and lower right corners in planar view in FIG. 5, respectively. The positioning parts 35 are engaged with projections (not illustrated) provided on a back side of the operation panel 10, so as to accurately position the operation key 30 in the opening 10a of the operation panel 10.

The wall 32a of the frame 32 has a protrusion 32bL formed in a central place in a left portion in planar view in FIG. 5. The protrusion (hereinafter referred to as left protrusion) 32bL in the left portion protrudes leftward in FIG. 5 away from the key top 31. Similarly, a protrusion 32bR is formed in a central place in a right portion in planar view in FIG. 5. The protrusion (hereinafter referred to as right protrusion) 32bR in the right portion protrudes rightward in FIG. 5 away from the key top 31.

On the upper end portion side (the operation panel 10 side) of the frame 32 of the operation key 30, an arm 40L that substantially extends in an S-shape and has spring characteristics is arranged between an upper left portion in FIG. 5 of the key top 31 and the left protrusion 32bL. One end of the aria 40L is connected to an upper start place on the left protrusion 32bL, while the other end is connected to a connection part (hereinafter referred to as upper left connection part) 31LU formed around an upper left corner in FIG. 5 of the key top 31. The upper left connection part 31LU is formed in a position distant from an upper left corner of a peripheral portion 31a of the key top 31 leftward (toward the left protrusion 32bL). In addition, an arm 40R that substantially extends in an S-shape and has spring characteristics is arranged between an upper right portion in FIG. 5 of the key top 31 and the right protrusion 32bR. One end of the arm 40R is connected to an upper start place on the right protrusion 32bR, while the other end is connected to a connection part (hereinafter referred to as upper right connection part) 31RU formed around an upper right corner in FIG. 5 of the key top 31. The upper right connection part 31RU is formed in a position distant from an upper right corner of the peripheral portion 31a of the key top 31 rightward (toward the right protrusion 32bR). The two arms 40L and 40R are both formed in the upper end portion (on the operation panel 10 side) of the wall 32a and elastically support, as a pair of arms, an upper portion in FIG. 5 of the key top 31 on the frame 32, which allows the key top 31 to displace toward the board 21 when pushed toward the hoard 21.

Thus, a pair of arms 40L and 40R extends from the connection parts 31LU and 31RU, which are provided in positions opposite to each other in the peripheral portion 31a of the key top 31, respectively, to sandwich the key top 31 between the connection parts 31LU and 31RU, toward the frame 32 and connected to the frame 32. The pair of arms 40L and 40R is so connected to the frame 32 as to allow the key top 31 to displace toward the push button switch 26.

Similarly on the upper end portion side of the frame 32, an arm 41L that substantially extends in an S-shape and has spring characteristics is arranged between a lower left portion in FIG. 5 of the key top 31 and the left protrusion 32bL. One end of the arm 41L is connected to a lower start place on the left protrusion 32bL, while the other end is connected to a connection part (hereinafter referred to as lower left connection part) 31LD formed around a lower left corner in FIG. 5 of the key top 31. The lower left connection part 31LD is formed in a position distant from a lower left corner of the peripheral portion 31a of the key top 31 leftward (toward the left protrusion 32bL). In addition, an arm 41R that substantially extends in an S-shape and has spring characteristics is arranged between a lower right portion in FIG. 5 of the key top 31 and the right protrusion 32bR. One end of the arm 41R is connected to a lower start place on the right protrusion 32bR, while the other end is connected to a connection part (hereinafter referred to as lower right connection part) 31RD formed around a lower right corner in FIG. 5 of the key top 31. The lower right connection part 31RD is formed in a position distant from a lower right corner of the peripheral portion 31a of the key top 31 rightward (toward the right protrusion 32bR). The two arms 41L and 41R are both formed in the upper end portion (on the operation panel 10 side) of the wall 32a and elastically support, as a pair of arms other than the pair of arms 40L and 40R, a lower portion in FIG. 5 of the key top 31 on the frame 32, which allows the key top 31 to displace toward the board 21 when pushed toward the board 21.

Thus, a pair of arms 41L and 41R also extends from the connection parts 31LD and 31RD, which are provided in positions opposite to each other in the peripheral portion 31a of the key top 31, respectively, to sandwich the key top 31 between the connection parts 31LD and 31RD, toward the frame 32 and connected to the frame 32. The pair of arms 41L and 41R is also so connected to the frame 32 as to allow the key top 31 to displace toward the push button switch 26.

The peripheral portion 31a of the key top 31 is so formed as to extend toward the board 21, and a locking part 34 protruding outward (toward the frame 32) is formed in a lower end portion (end portion on the board 21 side) of the peripheral portion 31a, that is to say, in a position lower than a surface of the key top 31. When the operation key 30 is fitted into the opening 10a of the operation panel 10, the locking part 34 locks to the periphery of the opening 10a so as to cause the key top 31 to lock to the operation panel 10 and prevent the key top 31 from coming up out of the opening 10a.

On the other hand, on the periphery of the frame 32, the positioning parts 35, each in a cylindrical hole shape, are formed at three corners, namely, the upper left, lower left, and lower right corners in planar view in FIG. 5. The positioning parts 35 are attached to three projections (not illustrated) formed around the opening 10a of the operation panel 10, respectively, so as to accurately position the operation key 30 with respect to the operation panel 10 and allow the key top 31 to face the opening 10a, as described above.

The key top 31 has a pressing part 45 with a cruciform cross section on a back face side (the board 21 side) of the key top 31. As illustrated in FIG. 8, the pressing part 45 extends toward the push button switch 26, and a minute space is provided between a bottom face of the pressing part 45 and a push button 26*a* in an upper portion of the push button switch 26. As seen from FIG. 8, a lower portion (on the push button switch 26 side) of the pressing part 45 substantially has the same height from the board 21 as that of the light projectors 25*b* of the LED light sources 25.

As illustrated in FIG. 5, the pressing part 45 is arranged in a position separated and deviated from a center position C in planar view of the key top 31 by a specified distance t, in order to avoid interference with a light transmissive, symbol displaying part arranged in the center position C in planar view of the key top 31, with the need for such arrangement being described above. The direction of deviation is set as a direction parallel to the directions, in which the key top 31 is supported on the frame 32 by a pair of arms (40L and 40R) and another pair of arms (41L and 41R). To be specific: Two (a pair of) connection parts (the upper left connection part 31LU and the upper right connection part 31RU) are arranged in the upper portion in FIG. 5 of the key top 31 for the connection with the pair of arms 40L and 40R and two (a pair of) connection parts (the lower left connection part 31LD and the lower right connection part 31RD) are arranged in the lower portion in FIG. 5 of the key top 31 for the connection with the pair of arms 41L and 41R, with the four connection parts each having a width n. Assuming that center points of the width n of the connection parts 31LU and 31RU are connected by a line L1 and center points of the width n of the connection parts 31LD and 31RD are connected by a line L2, the pressing part 45 is arranged on a line Lc that is parallel to the two lines L1 and L2 and passes through the center position C of the key top 31. The line Lc has a line width Wc, and the line width Wc is set as a width touching to each of the light projectors 25*b* of the four LED light sources 25 in planar view. The pressing part 45 is arranged in a position separated from the center position C of the key top 31 on the line Lc, that is to say, within the range of the line width Wc (within a hatched range in FIG. 5). In the present embodiment, the pressing part 45 is arranged in a position that is on a center line of the line width Wc and is separated and deviated from the center position C rightward in FIG. 5 (toward the right protrusion 32*b*R) by a specified distance t, as an example. An arrangement position of the pressing part 45 is not limited to the above example but may be a position that is on the center line of the line width Wc and is separated and deviated from the center position C leftward in FIG. 5 (toward the left protrusion 32*b*L) by a specified distance t or may not be on the center line of the line width Wc. The amount of deviation (namely, a specified distance t) is appropriately specified according to the number, diameter, and arrangement positions of the LED light sources 25 arranged on the board 21 and even according to the diameter and arrangement position of the push button switch 26.

The push button switch 26 is arranged in a position opposite to a lower end portion of the pressing part 45 on the board 21. The push button switch 26 in such arrangement position is being sandwiched between two LED light sources 25 at the upper right and the lower right in FIG. 5. The push button 26*a* in an upper end portion of the push button switch 26 is located with a minute distance to the lower end portion of the pressing part 45, as described above. If the push button 26*a* is pressed downward by the pressing part 45, the push button switch 26 takes a closing action and causes the image forming section 4 to function.

In the operation key 30, stoppers 50 extending toward the board 21 are provided on places protruding from the four corners of the key top 31 to the left and to the right in FIG. 5, namely; the upper left connection part 31LU, the upper right connection part 31RU, the lower left connection part 31LD, and the lower right connection part 31RD, respectively. Each of the stoppers 50 is in an approximately cylindrical shape somewhat tapered toward the board 21 and is arranged with a specified distance to the board 21 in the state, where a bottom portion of the frame 32 is positioned on the board 21. When the key top 31 is pushed toward the push button switch 26, bottom portions of the stoppers 50 come into contact with the board 21 after the pressing part 45 causes the push button switch 26 to take a closing action, which prevents further pushing of the key top 31.

As described above, the stoppers 50 are arranged on the four connection parts 31LU, 31RU, 31LD, and 31RD respectively, which protrude from the four corners of the key top 31 toward the arms 40L, 40R, 41L, and 41R. For this reason, as illustrated in FIG. 8, an axis 50*s* of each stopper 50 is deliberately made not to agree with a line 34*k* extending in a vertical direction in FIG. 8 that links center points in a thickness direction of the locking part 34 provided on the peripheral portion 31*a* of the key top 31, and is set in a position deviated from the line 34*k* outward (toward the frame 32) by a specified distance d.

As seen from FIG. 7, the operation panel 10 has a sloping portion 10*b* formed on the periphery of the opening 10*a*. The sloping portion 10*b* is a place on the periphery of the opening 10*a* that is so formed as to slope toward the inside of the opening 10*a* and downward (down to the board 21).

According to the configuration as described above, in the present embodiment, the key top 31 of the operation key 30 in the color start key 12 is colored in a color different from the color of other input devices such as the power key 11 and illuminated with the four LED light sources 25, so that the color start key 12 is definitely distinguishable from other input devices around the color start key 12, such as the stop key 14, leading to the improvement in distinguishability.

Figure 9A:
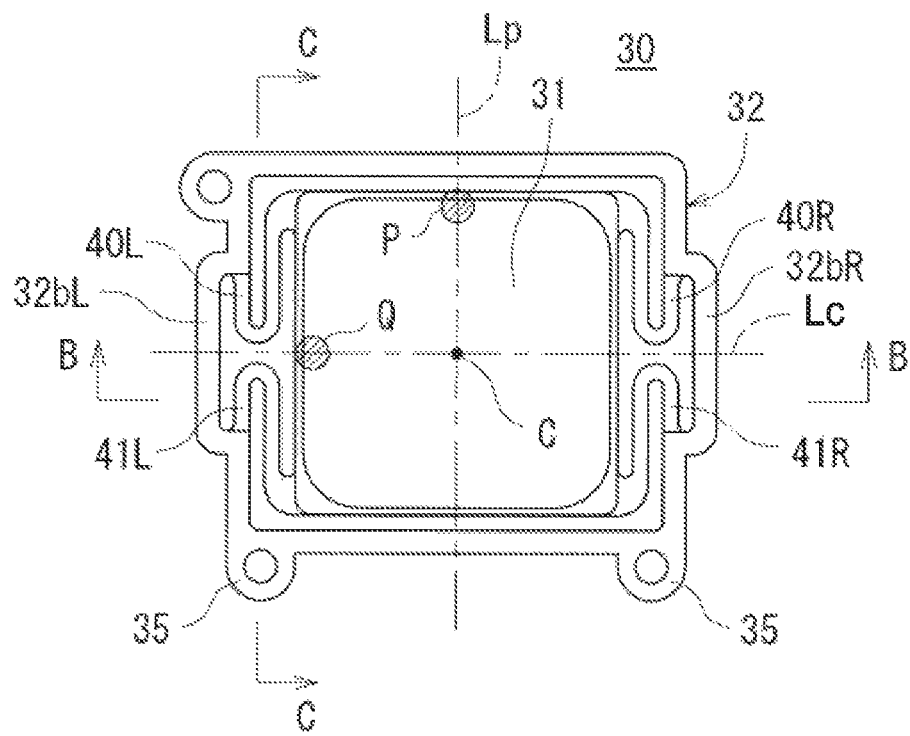
FIG. 9A is a plan view of the color start key.
Figure 9B:
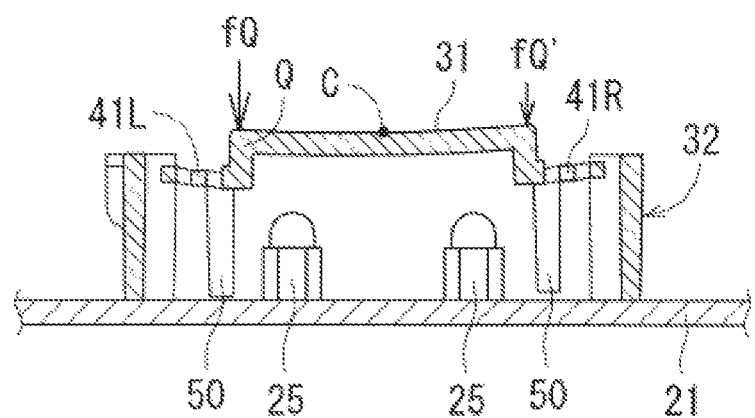
FIG. 9B is a cross-sectional view along line B-B in FIG. 9A.

In association with the presence of the four LED light sources 25, the pressing part 45 formed on a back face of the key top 31 and the push button switch 26 located directly under the pressing part 45 cannot be arranged in the center position C in planar view of the key top 31, so that the pressing part 45 and the push button switch 26 are arranged in a position separated and deviated from the center position C by a specified distance t. The pressing part 45 and the push button switch 26, however, are arranged on the line Lc, which is parallel to directions where the key top 31 is supported by two pairs of arms (40L and 40R, and 41L and 41R), that is to say, the direction of the line L1 connecting together a pair of connection parts (the upper left connection part 31LU and the upper right connection part 31RU) of the key top 31 and the direction of the line L2 connecting together another pair of connection parts (the lower left connection part 31LD and the lower right connection part 31RD) and passes through the center position C, and within the range of the line width Wc of the line Lc, as illustrated in FIG. 5. Consequently, if an operator pushes an end portion Q of the key top 31, namely, an end portion opposite from the arrangement position of the pressing part 45 on the line Lc as illustrated in FIG. 9A, a pushing force fQ applied to the end portion Q is conveniently transmitted to the pressing part 45 side because a left portion and a right portion in the line Lc direction of the key top 31 are supported by two pairs of arms (40L and 40R, and 41L and 41R), respectively, as illustrated in FIG. 9B (cross-sectional view along line B-B in FIG. 9A). The force is somewhat reduced indeed in the arrangement position of the pressing part 45, but the pressing part 45 is pushed down with a pushing force fQ' toward the board 21 so as to certainly cause the push button switch 26 to take a closing action.

Figure 9C:
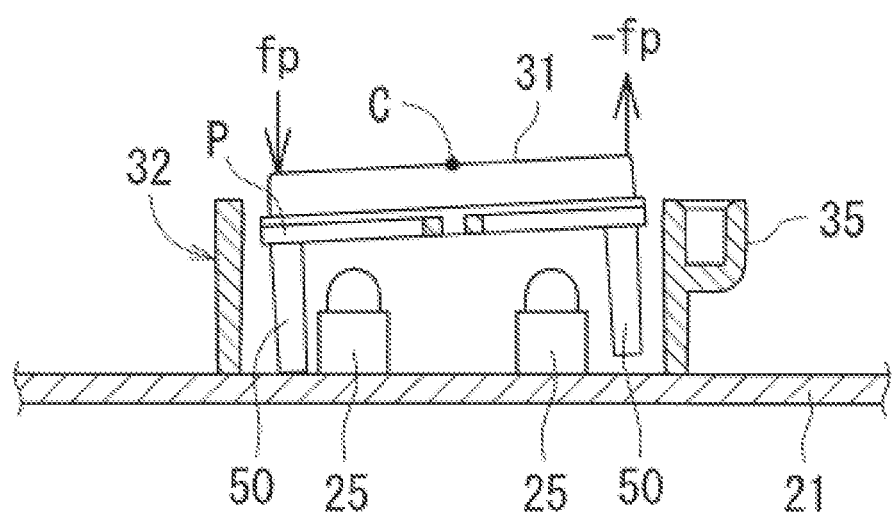
FIG. 9C is a cross-sectional view along line C-C in FIG. 9A.

If the operator pushes an end portion P of the key top 31, namely, an end portion on a line Lp that is orthogonal to the line Lc and passes through the center position C and the end portion P is pushed with a pushing force fp, an operation force −fp raising an end portion opposite from the end portion P upward (that is to say, in a direction opposite from a direction toward the push button switch 26) acts on the end portion opposite from the end portion P because the key top 31 is not in the state of being supported on the frame 32 in the line Lp direction as illustrated in FIG. 9C (cross-sectional view along line C-C in FIG. 9A). Consequently, the push button switch 26 is hardly caused to take a closing action if the pressing part 45 and the push button switch 26 are deviated and arranged in the vicinity of the end portion opposite from the end portion P on the line Lc in the key top 31. In the present embodiment, however, if the end portion P is pushed, a pushing force is transmitted in the direction of the line Lc so as to push down the pressing part 45 toward the board 21 as described above, so that it is possible to certainly cause the push button switch 26 to take a closing action.

Figure 10A:
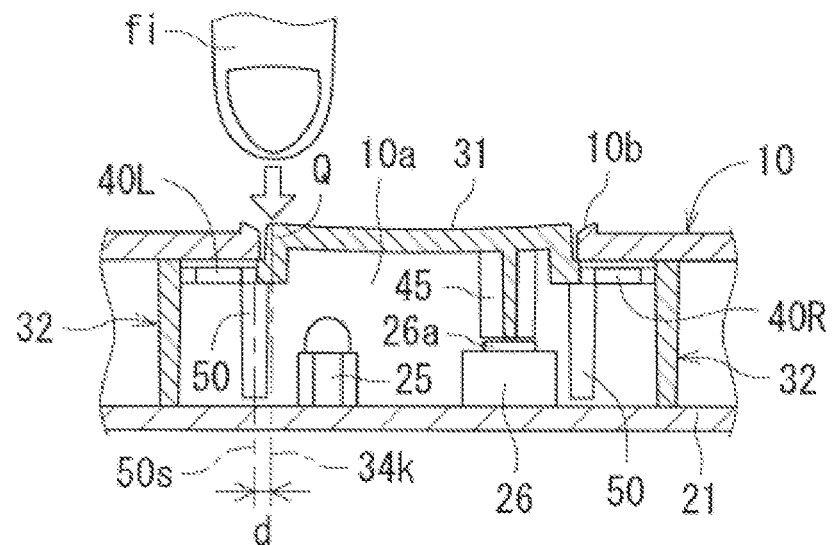
FIG. 10A is a diagram illustrating a state of the operation key before an end portion of a key top opposite from a pressing part is pushed.
Figure 10B:
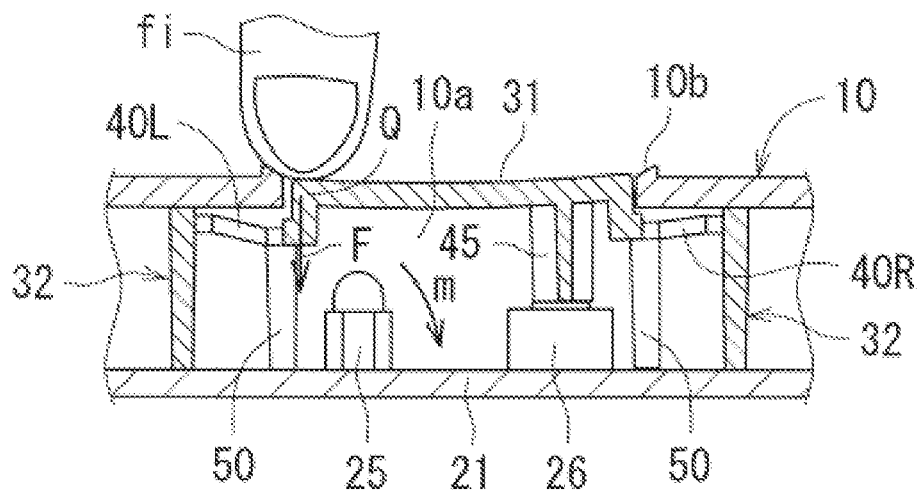
FIG. 10B is a diagram illustrating the state of the operation key at the beginning of pushing.
Figure 10C:
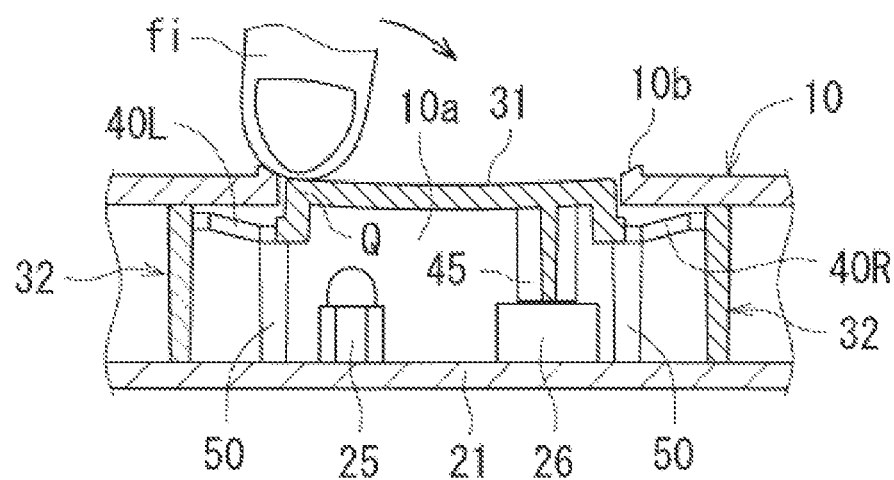
FIG. 10C is a diagram illustrating the state of the operation key in a middle period of pushing.

In the present embodiment, the stoppers 50 provided on the operation key 30 make it possible to further push down the pressing part 45 toward the board 21 so as to certainly cause the push button switch 26 to take a closing action. Such effects of the stoppers 50 are described based on FIGS. 10A through 10C. FIG. 10A is a cross-sectional view of a chief portion of the color start key 12 illustrating a state before an operator pushes, with a finger, the end portion Q of the key top 31, which portion is opposite from the pressing part 45 on the line Lc, FIG. 10B is a cross-sectional view of the chief portion illustrating an initial state of pushing of the end portion Q, and FIG. 10C is a cross-sectional view of the chief portion illustrating a final state of pushing of the end portion Q. As illustrated in FIG. 10A, when an operator pushes, with a finger fi, the end portion Q on the line Lc of the key top 31, the axis 50s of a stopper 50 in the vicinity of the end portion Q is in a position deviated from the line 34k linking center points in the thickness direction of the locking part 34 of the key top 31 toward the frame 32 by the distance d.

Therefore, if the finger fi of the operator pushes the end portion Q of the key top 31, the bottom portion of the stopper 50 is brought into contact with the board 21 by a pushing force F and then a moment m generates that rotates the key top 31 clockwise in FIG. 10B using the bottom portion of the stopper 50 as a fulcrum, as illustrated in FIG. 10B. The pressing part 45 is pushed down toward the board 21 by the moment m. In addition, the sloping portion 10b on the periphery of the opening 10a is located in the vicinity of the end portion Q of the key top 31, so that the finger fi of the operator starts coming into contact with the sloping portion 10b and is guided toward the inside of the opening 10a, and a force that tilts the key top 31 clockwise in FIG. 10B acts on the key top 31. As a result, a portion around the pressing part 45 of the key top 31 is pushed downward along with the arm 40R, so that the pressing part 45 presses down the push button switch 26 with a large force and the push button switch 26 takes a closing action.

Moreover, if the finger fi of the operator guided by the sloping portion 10b further inclines towards inside the opening 10a as illustrated in FIG. 10C, a force that tilts the key top 31 clockwise in FIG. 10C acts more strongly, so that the portion around the pressing part 45 of the key top 31 is further pushed down toward the board 21 and the pressing part 45 certainly causes the push button switch 26 to take a closing action.

Thus, owing to the arrangement of the axis 50s of the stopper 50 in the position, which is deviated from the line 34k of the locking part 34 in the end portion Q of the key top 31 toward the frame 32 by a specified distance d, the moment m is generated when the end portion Q of the key top 31 is pushed, so as to make a push down force acting on the pressing part 45 stronger, which allows the push button switch 26 to be certainly caused to take a closing action.

Modification

Figure 11:
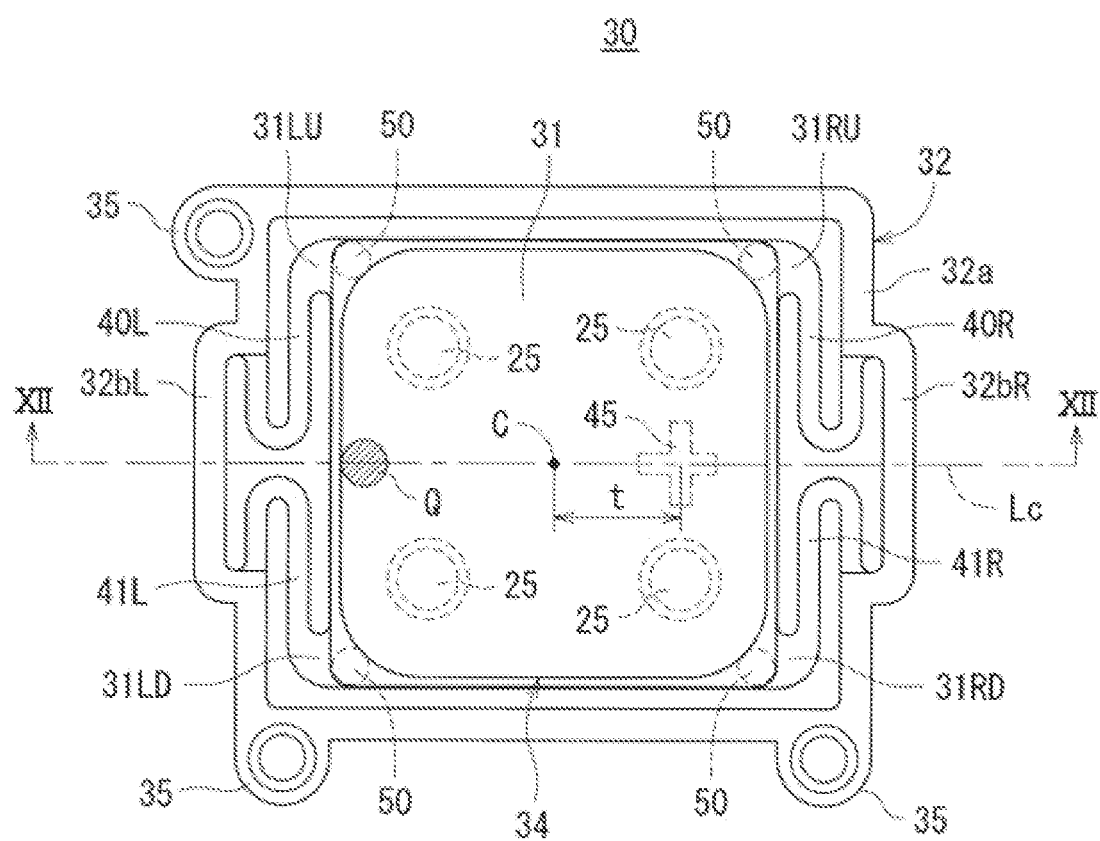
FIG. 11 is a plan view illustrating a color start key of a modification of Embodiment 1.
Figure 12:
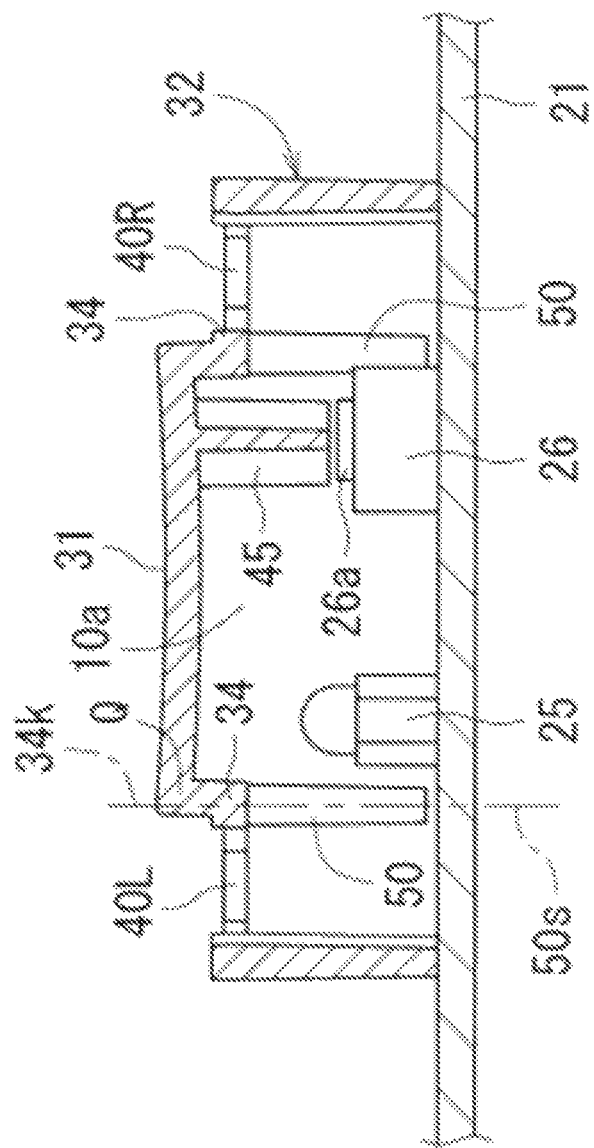
FIG. 12 is a cross-sectional view of the color start key along line XII-XII in FIG. 11.

FIGS. 11 and 12 illustrate a modification of Embodiment 1. FIG. 11 is a plan view of the key top 31 of the color start key 12, and FIG. 12 is a cross-sectional view along line FIG. 11. In Embodiment 1 as above, the stoppers 50 are arranged on the four connection parts 31LU, 31RU, 31LD, and 31RD and the axis 50s of each stopper 50 is set with the distance d to the line 34k linking center points of the locking part 34 of the key top 31, so as to generate the moment m during the pushing of the end portion Q. In contrast, in the present modification, the stoppers 50 are arranged on places at the four corners of the key top 31, respectively, with the places being included in the locking part 34 of the key top 31. In other words, the axis 50s of each stopper 50 is coaxially arranged with the line 34k linking center points of the locking part 34, as illustrated in FIG. 12.

Therefore, unlike Embodiment 1, the moment in does not generate during the pushing of the end portion Q in the present modification. In the present modification, although separated and deviated from the center position C of the key top 31 by a specified distance t, the pressing part 45 and the push button switch 26 are arranged on the line Lc passing through the center position C of the key top 31, that is to say, in a direction where the key top 31 and the frame 32 are supported by two pairs of arms (40L and 40R, and 41L and 41R), as is the case with Embodiment 1, so that it, is possible to conveniently push down the pressing part 45 and certainly cause the push button switch 26 to take a closing action even if the end portion Q of the key top 31 is pushed.

Embodiment 2

Figure 13:
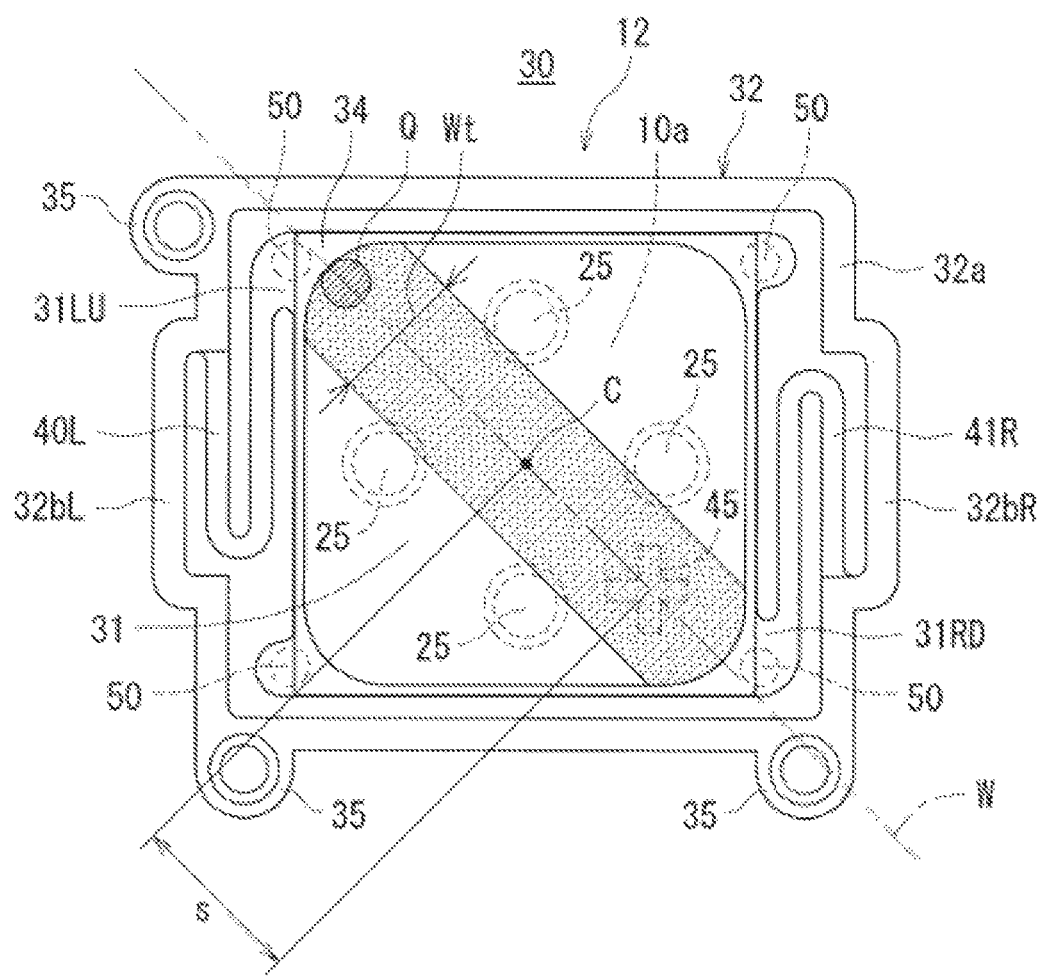
FIG. 13 is a plan view illustrating a color start key of Embodiment 2.

Next, a color start key 12 according to Embodiment 2 is described based on FIG. 13. FIG. 13 is a plan view of the color start key 12. While two pairs of arms (40L and 40R, and 41L and 41R) are provided in Embodiment 1 as above, the key top 31 is supported on the frame 32 by a single pair of arms (40L and 41R) in the present embodiment.

Specifically, as illustrated in FIG. 13, the arm 40L connected to the upper left connection part 31LU of the key top 31 and the arm 41R connected to the lower right connection part 31RD of the key top 31 constitute the single pair of arms. The four LED light sources 25, which are so arranged as to face the opening 10a, are located close, in planar view, to four sides of the key top 31 in the vicinity of central places on the sides, respectively. Instead of the four LED light sources 25, a single LED light source of a high illuminance may be arranged in the center position C of the key top 31.

Similarly to Embodiment 1, the stoppers 50 are arranged on connection parts, namely, the upper left connection part 31LU and the lower right connection part 31RD of the key top 31 and set in positions deviated from the locking part 34 on the periphery of the key top 31 toward the arms 40L and 41R.

In the present embodiment, the key top 31 is supported on the frame 32 in a direction of being connected by the pair of arms 40L and 41R, that is to say, in a direction of a line W that connects an upper left corner and a lower right corner in FIG. 13 of the locking part 34 provided on the periphery of the key top 31 and passes through the center position C. The line W has a line width Wt, and the line width Wt is set as a width touching to each of the light projectors 25b of the four LED light sources 25. The pressing part 45 is arranged in an optional position within the range of the line width Wt of the line W (within a hatched range in FIG. 13). In the present embodiment, the pressing part 45 is arranged in a position separated and deviated from the center position C of the key top 31 toward a lower right corner in FIG. 13 of the key top 31 by a distance s on a center line of the line W. The arrangement position of the pressing part 45 is not limited to the example in FIG. 13 but may be a position separated and deviated from the center position C toward an upper left corner of the key top 31 by the distance s, and does not need to be set on the center line of the line W, either. If a single LED light source is to be arranged in the center position C of the key top 31, it would be adequate to set the amount of deviation of the pressing part 45 (namely, the distance s) so that a positional interference with the LED light, source may be prevented.

Thus in the present embodiment, the pressing part 45 is arranged within the line width Wt of the line W indicating the direction, in which the key top 31 is supported on the frame 32 by a pair of arms (40L and 41R), so that, even if the end portion Q (at an upper left corner in FIG. 13) of the key top 31, which is opposite from the pressing part 45 in the direction of deviation of the pressing part 45, is pushed, a portion on the lower right corner side of the key top 31 is certainly pushed downward by a pushing force applied to the end portion Q, the pressing part 45 is pushed down, and the push button switch 26 certainly takes a closing action. Consequently, also in the present embodiment, it is possible to certainly cause the push button switch 26 to take a closing action while enhancing the distinguishability of the color start key 12 by the illumination with the LED light sources 25 and improve the certainty of action.

The stoppers 50 are deviated from the locking part 34 of the key top 31 toward the arms 40L and 41R, so that the moment m generates similarly to Embodiment 1 when the end portion Q of the key top 31 is pushed, which makes A possible to certainly cause the push button switch 26 to take a closing action.

In the above description, an aspect of the present invention is applied to the color start key 12 and the monochrome start key 13, while an aspect of the present invention may be applied to other input devices, such as the power key 11 and the stop key 14, and is naturally also applicable to an input device of an apparatus other than the image forming apparatus 1.

An aspect of the present invention can be implemented in various different forms without departing from the spirit or chief features of the present invention. Therefore, the embodiments as described above are merely examples and should not be interpreted restrictively. Modifications and changes of an aspect of the present invention falling within the scope of equivalents to the claims are all within the scope of an aspect of the present invention.

According to an aspect of the present invention, even if, in an input device with a light source arranged on a board in order to enhance the distinguishability of a key top, a pressing part for pressing down a push button switch is arranged in a position separated and deviated from a center position of the key top in order to prevent a positional interference with the light source, the pressing part is pushed down whenever the key top is pushed, so as to certainly cause the push button switch to take a closing action and thereby improve the certainty of action, so that such aspect of the present invention is applicable to the input device, of which a high distinguishability is required, and is accordingly useful.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An input device comprising:
    an operation key arranged in an opening of a panel; and
    a light source and a push button switch each arranged in a position opposite to the opening on a board,
    wherein the operation key includes:
    a key top having a pressing part extending toward the push button switch;
    a frame formed with a wall surrounding the light source and the push button switch; and
    one or more pairs of arms extending from connection parts that are provided in positions opposite to each other in a peripheral portion of the key top, respectively, to sandwich the key top between the connection parts toward the frame and connected to the frame,
    wherein the pressing part is arranged in a position separated from a center position in planar view of the key top on a line that is parallel to a line connecting the connection parts of the key top, which are connected with one pair out of the one or more pairs of arms, and passes through the center position, and
    wherein the push button switch is arranged in a position on the board opposite to an arrangement position of the pressing part.

2. The input device according to claim 1, wherein, in the operation key; the key top and the one or more pairs of arms are arranged on a side of the frame closer to the panel.

3. The input device according to claim 1, wherein stoppers that extend toward the board and come into contact with the hoard when the key top is pushed toward the push button switch are provided on a periphery of the key top.

4. The input device according to claim 3,
    wherein the stoppers are provided on the connection parts of the key top, and
    wherein the connection parts are each formed in a position distant from an end portion of the key top in a direction toward the frame.

5. The input device according to claim 3,
    wherein the stoppers are provided on a locking part that causes the key top to lock to the panel, and
    wherein the locking part is provided in a place where the peripheral portion of the key top is made to protrude toward the frame, and in a position lower than a surface of the key top.

6. The input device according to claim 1, wherein the panel has a sloping portion on a periphery of the opening that slopes towards inside the opening and down to the board.

7. An image forming apparatus comprising the input device according to claim 1.

\* \* \* \* \*